Nov. 11, 1958 — H. Y. LEE — 2,859,635
SECTIONAL GEARS
Original Filed April 9, 1953

INVENTOR.
Henry Y. Lee
BY *Robert U. Geib, Jr.*
ATTORNEY

United States Patent Office 2,859,635
Patented Nov. 11, 1958

2,859,635

SECTIONAL GEARS

Henry Y. Lee, Honolulu, Territory of Hawaii

Original application April 9, 1953, Serial No. 347,711, now Patent No. 2,748,618. Divided and this application March 14, 1956, Serial No. 571,431

2 Claims. (Cl. 74—439)

This invention relates to sectional gears, and more particularly to sectional gears which are divided transversely of their axes of rotation and comprising a pair of aligned and peripherally toothed elements, the present application being a division of my pending patent application Serial No. 347,711, filed April 9, 1953, now Patent No. 2,748,618.

As stated in the aforementioned pending patent application, it is well-known that the subjection of gears of all types to repeated forces of bending, pressure and friction results in gradual wear on the gear teeth and fatigue of the metal of which they are composed, thereby requiring frequent repair or replacement. This is particularly true of peripherally toothed gears.

In the case of herringbone gears, both their production and repair are considerably more difficult and require a more specialized type of skill and equipment than for such gears as spur, bevel, spiral, etc.

It is among the objects of the present invention, as well as that of the aforementioned earlier patent application, to substantially reduce the disadvantages set forth hereinabove by providing a sectional gear structure which is comparatively inexpensive and easy to manufacture, and yet efficient and durable in service.

Another object is the attainment of the foregoing objectives with a sectional gear which may be easily and speedily repaired or replaced.

Still another object is to provide a peripherally toothed gear of the herringbone type which is possessed of the foregoing characteristics.

A further object is to provide an improved gear of the type referred to which is characterized by improved distribution of the load from the fastening instrumentalities.

A still further object is the provision in a gear of the class described of means enabling certain of the component parts to be made from stocks of standard shape and of different metals as determined by the use for which they are intended.

The invention, then, comprises the features fully described, and as particularly pointed out in the claims, the following description and annexed drawings setting forth in detail illustrative embodiments of the invention, these being indicative of but several of a number of ways in which the principles of the invention may be employed.

Figure 1:
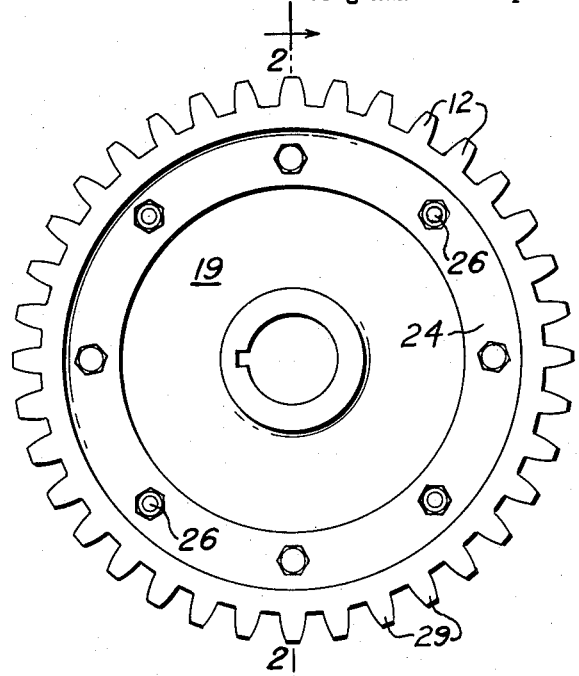
Figure 1 is a side elevational view of a gear of the so-called "web type" which embodies the teachings of the present invention.
Figure 2:
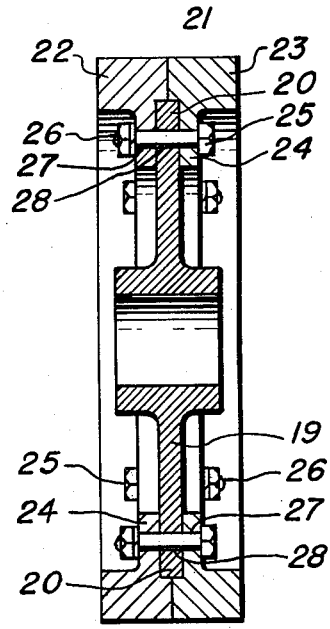
Figure 2 is a sectional view on the line 2—2 of Figure 1.

Referring more particularly to the drawings, the sectional gear of Figures 1 and 2 comprises a left-hand gear section and a right-hand gear section, the said sections being divided or split transversely of their axes of rotation and adapted for closely abutting relationship. The peripheries of these gear sections, which will be described more fully hereinafter, are provided with oblique or helical teeth 12 of identical shape and size; whereby the said sections may be so assembled as to form the composite V-shaped teeth which characterize a herringbone gear.

The gear of Figures 1 and 2 comprises a conventional hub with a web 19 having a machine-finished circumferential rim 20 (see Figure 2) which occupies correspondingly shaped opposed recesses 21 in the left-hand and right-hand gear bands 22 and 23, respectively.

Referring still to Figure 2, each of the opposed recesses 21 (in the left-hand and right-hand gear bands 22 and 23, respectively) is of a depth sufficient to accommodate one-half of the thickness of the machine-finished circumferential rim 20, whereby the latter is fully encased. Each of the left-hand and right-hand gear bands 22 and 23 is provided with a flange 24 which extends inwardly of, and perpendicularly with respect to, the toothed periphery of each gear band, the said flanges forming extensions of the inner faces of the aforementioned opposed recesses 21. According to such construction, the gear bands 22 and 23 may be bonded together, and to the machine-finished circumferential rim 20 of the web 19, by means of bolts 25 and locked-nuts 26, the said bolts extending through anchor holes 27 in the aforementioned flanges 24 and anchor holes 28 in said rim 20.

Setting or identification of the gear teeth may be made on the exterior cheeks of the toothed elements by means of punched markings 29 (see Figure 1) in the manner well known in the art.

In view of the fact that the maximum force exerted on the teeth of herringbone gears is at the junction of the helical teeth, it is at such points that repair is most frequently required; and one of the most important objectives of the present invention is to provide a sectional gear which is analogous to the gears of Figures 1 and 2, but which is characterized by increased strength at the mid-section of the toothed peripheries of the gear components. Such increased strength accrues from the pug-nose herringbone gear shown in Figures 3 and 4.

Figure 3:
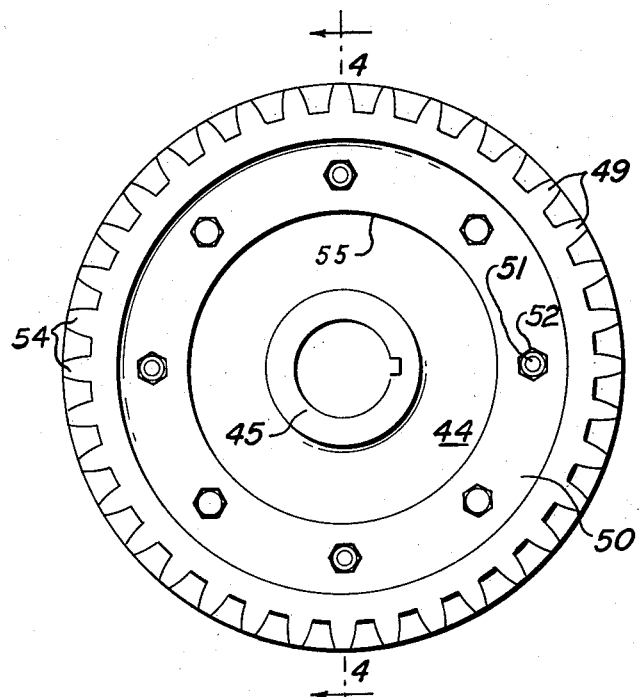
Figure 3 is a side elevational view of a modification, the same comprising a "pug nose" herringbone gear which utilizes a hub and web.
Figure 4:
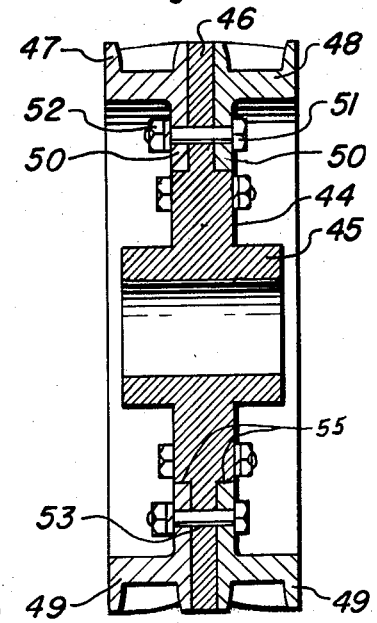
Figure 4 is a sectional view on the line 3—3 of Figure 3.

The pug-nose herringbone gear of Figures 3 and 4 comprises a web 44 carried by a hub 45, the periphery of the web being provided with teeth 46 of the spur gear type. The numerals 47 and 48, respectively, designate the left-hand and right-hand gear bands, the peripheries of which are provided with oblique or helical gear teeth 49. The outside diameter, pitch diameter and number of teeth 49 on the gear bands 47 and 48 are the same as those of the spur teeth 46 of the web 44; and the respective teeth are, of course, aligned to form a pug-nose herringbone.

As shown in Figure 4, each of the left-hand and right-hand gear bands 47 and 48 is provided with a flange 50 which extends inwardly of, and at right-angles to, the toothed peripheries of said gear bands. These flanges 50 form extensions of the inner faces of the gear bands and permit all three of the toothed gear elements or sections to be secured or bonded together by bolts 51 and locked-nuts 52, the bolts 51 extending through aligned anchor holes 53 in the web 44 and the flanges 50 on either side thereof.

As in the case of the embodiment of Figures 1 and 2, punch markings 54 on the exposed surfaces of the gear bands 47 and 48 and the intermediate web 44 may be used to identify, match, or time the various gear elements.

While I have shown and described certain specific embodiments of the present invention, it will be readily understood by those skilled in the art that I do not wish to be limited exactly thereto, since various modifications may be made without departing from the scope of the invention as defined in the appended claims.

I claim:

1. A sectional gear comprising a hub, a radial flange carried by said hub, the periphery of said flange being provided with gear teeth, a pair of similar and cooperative centrally apertured gear elements which are so disposed that the adjacent ends of their respective teeth closely abut and are in alignment with the gear teeth on the periphery of said radial flange, a flange carried by each of said gear elements and extending radially inward toward said rotatable hub, and screw-threaded means for holding all of said flanges together.

2. A sectional gear comprising a hub, a radial flange carried by said hub and providing an annular shoulder on each of its sides, the periphery of said flange being provided with gear teeth, a pair of similar and cooperative centrally apertured gear elements which are so disposed that the adjacent ends of their respective teeth closely abut and are in alignment with the gear teeth on the periphery of said radial flange, a flange carried by each of said gear elements, said last-mentioned flanges extending radially inward toward said rotatable hub with the inner ends thereof in contact with the annular shoulders on the sides of said first-mentioned radial flange, and screw-threaded means for holding all of said flanges together.

References Cited in the file of this patent

UNITED STATES PATENTS

| | | |
|---|---|---|
| 332,998 | Coupland | Dec. 22, 1885 |
| 415,044 | Joslin | Nov. 12, 1889 |
| 470,952 | Scholfield | Mar. 15, 1892 |
| 1,165,830 | Alquist | Dec. 28, 1915 |
| 1,512,560 | Moore | Oct. 21, 1924 |
| 2,748,618 | Lee | June 5, 1956 |